United States Patent [19]

Krieger et al.

[11] Patent Number: 4,919,088
[45] Date of Patent: Apr. 24, 1990

[54] TWO CYCLE ENGINE SCAVENGING HEAT CONTROL

[75] Inventors: Roger B. Krieger, Birmingham; Rodney B. Rask, Grosse Pointe Woods, both of Mich.

[73] Assignee: General Motors Corporation, Detroit, Mich.

[21] Appl. No.: 369,359

[22] Filed: Jun. 21, 1989

[51] Int. Cl.⁵ .......................................... F02M 31/14
[52] U.S. Cl. ................................... 123/65 A; 123/556
[58] Field of Search ........... 123/65 A, 65 BA, 73 PP, 123/556, 65 R

[56] References Cited

U.S. PATENT DOCUMENTS

| 2,781,032 | 2/1957 | Sebok et al. | 123/556 |
| 3,686,058 | 2/1975 | Hoare | 123/556 |
| 3,974,802 | 8/1976 | Lundquist | 123/556 |
| 4,236,490 | 12/1980 | Correll | 123/65 A |
| 4,340,015 | 7/1982 | Gonzalez | 123/65 A |
| 4,545,357 | 10/1985 | Kearsley et al. | 123/556 |
| 4,638,770 | 1/1987 | Fox | 123/65 A |
| 4,846,136 | 7/1989 | Phillips | 123/556 |

FOREIGN PATENT DOCUMENTS

| 3043584 | 6/1981 | Fed. Rep. of Germany | 123/556 |
| 2146386 | 4/1985 | United Kingdom | 123/556 |
| 2155665 | 9/1985 | United Kingdom | 123/556 |

*Primary Examiner*—David A. Okonsky
*Attorney, Agent, or Firm*—Robert J. Outland

[57] ABSTRACT

A two cycle engine wherein the scavenging gas is heated at low loads to improve scavenging. The gas may be heated by passage through finned passages in heat exchange relation with the exhaust ports with valves to direct the flow through unheated passages during higher load operation.

3 Claims, 2 Drawing Sheets

TWO CYCLE ENGINE SCAVENGING HEAT CONTROL

TECHNICAL FIELD

This invention relates to two cycle engines and more particularly to scavenging and charging of the cylinders.

BACKGROUND

Two-stroke cycle, or two cycle, engines are known to suffer combustion process deterioration at part load. To understand this phenomena, it is helpful to contrast two-stroke cycle engine scavenging with four-stroke cycle engine scavenging. In the two cycle engine, the scavenge air enters the cylinder while the exhaust port is open. This means that cylinder pressure is nearly atmospheric and the entering scavenge air is thus at nearly atmospheric pressure and temperature. The resultant high density of the scavenge air means its volume is small at the small delivery ratios characteristic of part load operation. As a result, the small volume of scavenge air is unable to purge the cylinder of much exhaust gas residual. In contrast, in the four cycle engine the entire cylinder displacement volume is purged of exhaust residual gases by the piston. As a result, the incoming fresh charge, which is at low density corresponding roughly to manifold vacuum, fills most of the cylinder volume. The result of this is that the four cycle combustion process is more stable and reliable because the mass fraction of residual in the cylinder is smaller at a given load than that of a two-stroke engine. In addition, the mixture in the vicinity of the spark plug at the time of ignition in a four cycle engine is more likely to be low in residual than for the two cycle. In summary, one of the principal differences in operation of two cycle and four cycle engines at part load is that the four cycle charge is at lower density than that of the two cycle leading to less difficulty in achieving satisfactory combustion. This invention provides a means of lowering the charge density of the scavenge gases at part load to promote scavenging a greater volume of exhaust residual gases for a given delivery ratio, thus providing a combustible charge with lower mass fraction residual, greater fresh charge volume, and therefore greater likelihood of satisfactory ignition and combustion.

SUMMARY OF THE INVENTION

The present invention involves routing all or a portion of the scavenge gases at part load (before they enter the cylinder) through a chamber or passage which is in thermal contact with the hot gases in the exhaust port. This is accomplished by arranging the two gas streams as hot and cold fluids of a heat exchanger. Through this arrangement, the scavenge gases are heated during the non-scavenge and scavenge portions of the cycle. This heating decreases the density of the scavenge gases thus increasing their volume. As a result, when these scavenge gases enter the cylinder, their increased volume causes them to displace a greater volume of residual exhaust products, thus improving scavenging. The fresh scavenge gases then occupy a large fraction of the cylinder volume at a lower density with the result that the cylinder charge is more analogous to that of the four cycle engine where the cylinder is scavenged more completely and a lower density charge is inducted for the next cycle. This resultant mixture is more favorable for ignition since it is less likely that the spark plug will be surrounded by only residual products. This mixture is also more favorable for flame propagation since the mass fraction of residual exhaust products in the mixture is decreased, which would increase flame propagation speeds.

Among the features of the invention as herein disclosed are:

1. A method and means to decrease the density of the incoming charge at any given load to improve part load scavenging of two cycle engines.
2. A method and means to modulate the decrease of density of the scavenge gases depending on load which is adaptable to both crankcase and blower scavenged two cycle engines.
3. A method and means to decrease the density of the incoming charge which does not interfere with exhaust tuning at full load or exhaust treatment for emission control.

Those and other features and advantages of the invention will be more fully understood from the following description of certain specific embodiments of the invention taken together with the accompanying drawings.

BRIEF DRAWING DESCRIPTION

DETAILED DESCRIPTION

Figure 1:
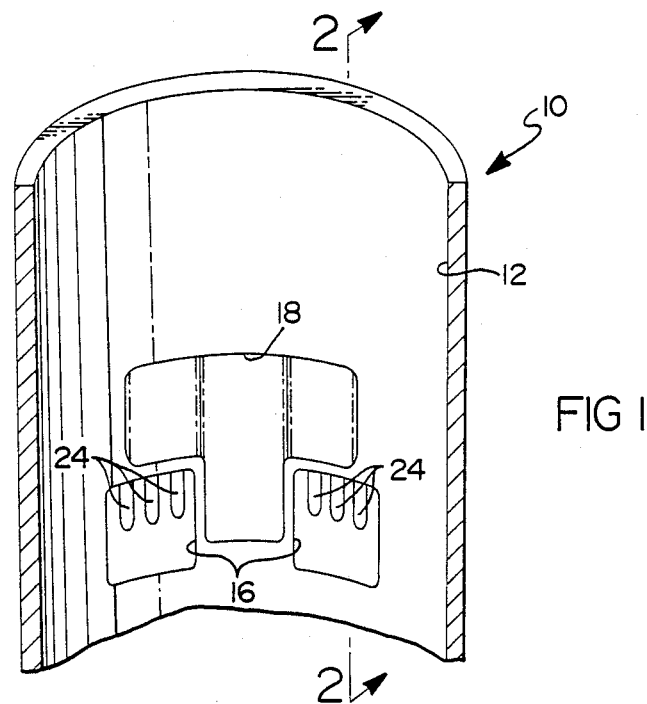
FIG. 1 is a pictorial cross-sectional view of an engine with a cylinder having scavenging ports formed according to the invention.
Figure 2:
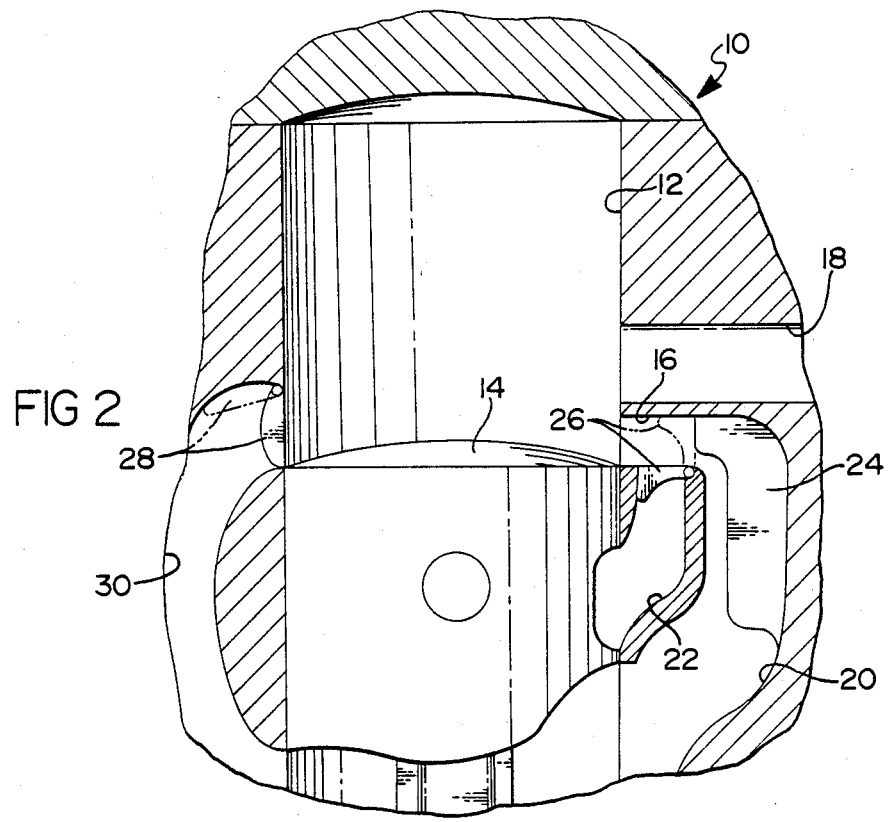
FIG. 2 is a cross-sectional view from the plane of the line 2—2 of FIG. 1.

Referring now to the drawings in detail, it is shown that the concept could be implemented in a variety of ways. One such way for a crankcase scavenged engine is shown in FIGS. 1 and 2. An engine 10 includes a cylinder 12 containing a piston 14. Two intake ports 16 are located beneath an exhaust port 18. Scavenge air is supplied to these ports from two transfer passages, a heated one 20 and a cool one 22, shown in FIG. 2. Fins 24 extend down into the heated transfer passage 20. These fins improve heat transfer from the hot exhaust port 18 to the gases in the heated transfer passage 20. For part load operation, a transfer passage diverter valve 26 blocks off the cool transfer passage 22 and a shut-off valve 28, in a main transfer port 30 offset from the exhaust port 18, is closed so that only the heated, low-density scavenge gases enter the cylinder. As load is increased, the transfer port shut-off valve 28 is opened to mix some cooler scavenge gases with the heated scavenge gases. When maximum power with this arrangement is reached, the cool transfer passage 22 is opened by starting to open the transfer passage diverter valve 26. When this valve is fully open, the engine will be scavenged in a conventional way with cool scavenge gases for maximum power, since the heated transfer passage 20 will be closed by the transfer passage diverter valve 26.

An alternative to the control scheme outlined above would be to modulate both the transfer port shut-off valve 28 and the transfer passage diverter valve 26 to obtain best scavenging at part load. Any combination of valves open, closed, or part-open is possible to achieve the best scavenging at various operating conditions.

Figure 3:
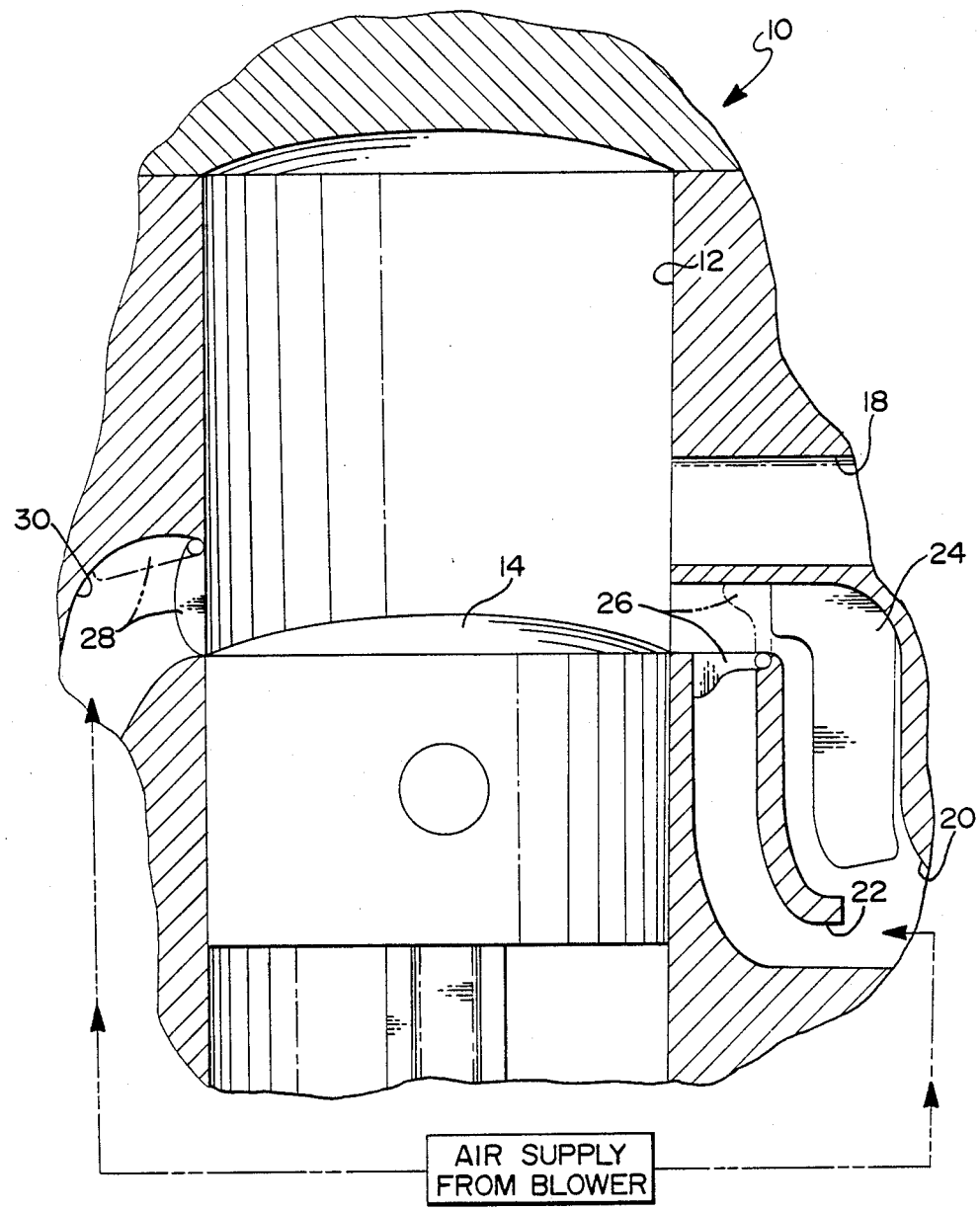
FIG. 3 is a cross-sectional view similar to FIG. 2 but showing an alternative embodiment of engine according to the invention.

FIG. 3 shows an implementation of the concept for a blower scavenged engine. The above description applies to this implementation as well.

While the invention has been described by reference to certain preferred embodiments, it should be understood that numerous changes could be made within the spirit and scope of the inventive concepts described. Accordingly it is intended that the invention not be limited to the disclosed embodiments, but that it have the full scope permitted by the language of the following claims.

The embodiments of the invention in which an exclusive property or privilege is claimed are defined as follows:

1. A two cycle engine having a cylinder,
   a scavenging and charging intake port opening into the cylinder,
   a first fluid passage connecting the port with a source of scavenging and charging air,
   a second fluid passage connecting the port with said air source,
   heating means in said first passage for heating the air therein, and
   valve means coacting with said passages to oppositely variably restrict flow therethrough and thereby control the degree of heating of scavenging and charging air delivered to the cylinder through said intake port.

2. A two cycle engine as in claim 1 and further comprising
   an exhaust port in the cylinder adjacent said first fluid passage,
   said heating means comprising heat exchange fins in said first passage and in heat exchange relation with said exhaust port to transfer exhaust heat for delivery to air in said first passage.

3. A two cycle engine as in claim 1 and further comprising additional transfer ports connecting said air source with said cylinder, and
   second valve means coacting with said additional ports to limit flow therethrough during low load operation with substantial heating of the air delivered through said intake port.

* * * * *